United States Patent [19]

Lipke

[11] 4,151,415
[45] Apr. 24, 1979

[54] ACTIVE IMAGING SYSTEM USING VARIABLE GATE WIDTH TIME PROGRAMMED DWELL

[75] Inventor: Donald L. Lipke, Garland, Tex.

[73] Assignee: Varo, Inc., Garland, Tex.

[21] Appl. No.: 847,032

[22] Filed: Oct. 31, 1977

[51] Int. Cl.² .......................................... H01J 31/49
[52] U.S. Cl. .................................... 250/333; 250/341
[58] Field of Search ............... 250/330, 333, 334, 338, 250/340, 341, 342; 356/3, 4

[56] References Cited

U.S. PATENT DOCUMENTS

| 3,774,043 | 11/1973 | LeCarvennec | 250/333 |
| 4,063,093 | 12/1977 | Astheimer et al. | 250/333 |

Primary Examiner—Davis L. Willis
Attorney, Agent, or Firm—Richards, Harris & Medlock

[57] ABSTRACT

An imaging system for detection of a target is provided which compensates for range dependency of a reflected interrogating signal. The imaging system includes an electromagnetic radiation source for generating a series of interrogating pulse signals directed towards the target. A receiver is triggered for receiving the reflected interrogating pulse signals from the target during variable time intervals and for generating a resultant output signal. The receiving time intervals are varied such that the number of reflected interrogating pulse signals received by the receiver is dependent on the distance between the receiver and the target. The receiver thus generates a constant amplitude resultant output signal independent of the distance between the receiver and target.

13 Claims, 3 Drawing Figures

ACTIVE IMAGING SYSTEM USING VARIABLE GATE WIDTH TIME PROGRAMMED DWELL

RELATED INVENTIONS

This invention is an improvement on the invention disclosed and claimed in copending patent application by Richard H. Laughlin, Ser. No. 809,052, filed June 21, 1977, entitled ACTIVE IMAGING SYSTEM USING TIME PROGRAMMED DWELL and assigned to the present Assignee.

FIELD OF THE INVENTION

This invention relates to active imaging systems, and more particularly relates to an active imaging system which automatically compensates for the range dependence of the intensity of a reflected interrogation signal returned from a target.

THE PRIOR ART

A problem in the detection of targets utilizing active illuminators to generate an interrogation signal is the range dependence of the amplitude of the returned reflected interrogation signal from the target. This problem of range dependence of the returning interrogation signal has resulted in reflected signals having widely varying amplitudes in radar systems, laser range finders and other optical interrogation systems. The reflected signal strength or irradiance from the target in such systems is defined by the standard radar range equation known to those skilled in the art. Signal power (P) is a function of the target cross section, the range to the target and the integrating radiant intensity. The signal power (P) of an active illuminator system can be defined by the following equation:

$$P(\text{watts}) = P_{peak} d E_c T \sigma / \Omega R^4 \tag{1}$$

where
$P_{peak}$ is the peak power output of the illuminator;
d is the duty cycle of the illuminator;
$E_c$ is the optical collection efficiency;
$\Omega$ is the projected beam width;
$\sigma$ is the target cross-section;
R is the range to the target; and
T is the transmission of the receiving optical system.

From this equation, it therefore can be seen that the signal power (P) is a function of the range (R) to the target by a factor of the reciprocal of range to the fourth power. In active imaging systems such as image intensifier receivers, therefore, it is desirable to compensate for the decrease in signal intensity as the range to the target increases. Such a system to compensate for the range of the target should present a signal to an operator which will not substantially vary as a function of range. In the case of an active illuminator system, such a range compensator should thus result in the viewing of a target with constant brightness.

Previously developed systems using discrete detectors have utilized a time programmed gain such that the detector gain increases as a function of time to the fourth power. This gain increase maintains a constant signal output which is independent of range for a constant cross section target. Additional past imaging systems have utilized high peak power pulsed illumination systems in conjunction with gated imaging systems to gate out unwanted background or look through undesirable foreground clutter. However, these systems have had the disadvantage that the interrogation signal returned from the target is range dependent, such that signals from targets at longer ranges were weaker, by the fourth power of the range ratio, than the signals from targets at short ranges. This disadvantage results in obscuring targets at long ranges and saturating the system by targets at short ranges.

A need has thus arisen for an imaging system which will accurately represent to an operator the presence of targets both at long and short ranges. A need has further arisen for an imaging system which will compensate for the range dependent brightness of the reflected interrogation signal returned from a target. Furthermore, such a system should have the capability of gating out unwanted background and foreground clutter.

A system which provides the above advantages is disclosed in patent application Ser. No. 809,052, previously noted. In this system, the receiver is gated open at fixed window intervals, the number of window intervals being increased as the range to the target increased. The present system provides an alternative approach by utilizing a variable length window which is open whenever reflected interrogation signals are returning from the maximum range, in order to maximize the signal strength received from the maximum range of interest.

SUMMARY OF THE INVENTION

The present invention is directed to an active imaging system which automatically compensates for the range dependent brightness of a reflected interrogation signal returned from a target, and which substantially eliminates or reduces the disadvantages associated with prior art imaging systems.

In accordance with the present invention, an imaging system for detection of a target comprises an electromagnetic radiation source for generating a series of interrogating pulse signals directed towards the target. A receiver is triggered for receiving during variable time intervals reflected interrogating pulse signals from the target and for generating a resultant output signal, such that the number of reflected interrogating pulse signals received by the receiver is dependent on the distance between the receiver and the target. The receiver thus generates a resultant output signal to provide a signal of constant amplitude which is independent of the distance between the receiver and the target.

In accordance with another aspect of the present invention, an active imaging system for detection of a target includes a laser for generating a gated interrogating signal having a fixed gate width and directed towards the target. A gated image intensifier is triggered to receive reflected interrogating signals from the target during variable window intervals. Circuitry is provided for synchronizing the operation of the laser and the image intensifier. The system further includes circuitry interconnected between the synchronizing circuitry and the gated image intensifier for triggering the image intensifier to receive reflected interrogating signals during the variable window intervals in dependence upon the distance between the target and the image intensifier. The image intensifier further includes a characteristic which integrates the received reflected interrogating signals to generate a resultant signal of constant amplitude independent of the distance between the image intensifier and the target.

In accordance with yet another aspect of the present invention, a method employing an imaging system for detection of a target includes generating an interrogating signal having a fixed gate width directed towards the target. The method further includes receiving at a receiver the reflected interrogating signals from the target during preselected variable window intervals. The receiver is triggered to receive the reflected interrogating signals during the preselected variable window intervals. The triggering is dependent upon the distance between the target and the receiver. Once the receiver is triggered, the window interval begins and the window remains open until reflected signals have returned from the maximum range of interest.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
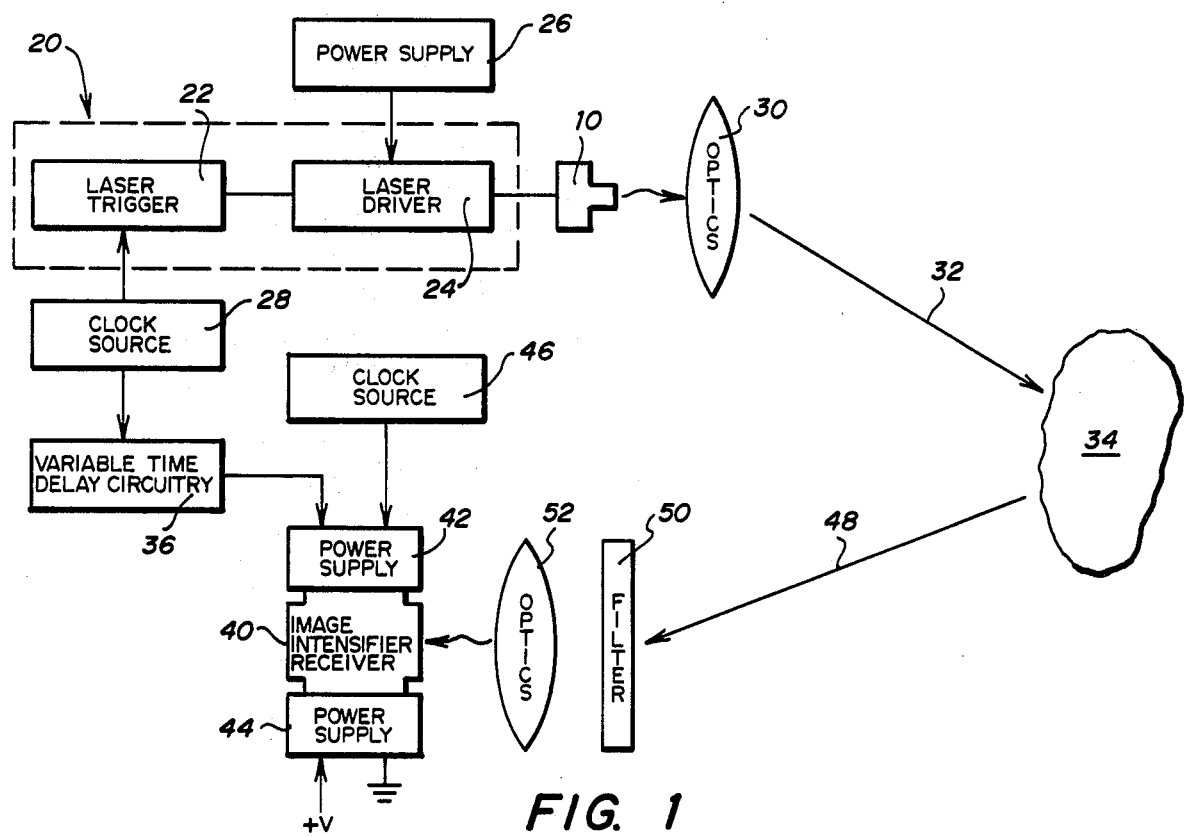
FIG. 1 is a block diagram of the present imaging system.

Referring to FIG. 1, a block diagram of the present active imaging system is illustrated. The system includes a source of electromagnetic radiation, such as a laser diode array 10 and associated circuitry, generally identified by the numeral 20. Although a laser is illustrated as the source of electromagnetic radiation for illuminating the target, it will be understood that the present system can also use a radar or any optical source, such as a broad band optical source including a Xenon flash lamp, for generating an interrogating signal. The laser diode array 10 may comprise, for example, a Model LD-360 diode array manufactured and sold by Laser/Diode Laboratories, Inc. of Metuchen, N.J. Such a laser diode array has a peak power of 600 watts and the capability of converting electrical current into optical energy radiated at 820 nanometers.

The laser diode array associated circuitry 20 includes a laser trigger 22 interconnected to a laser driver 24, which provides an output to the laser diode array 10. The laser trigger 22 and laser driver 24 may comprise, for example, a complete module such as Model LP-200 manufactured and sold by Laser/Diode Laboratories, Inc. A power supply 126 is connected to power the laser driver 24.

An input to the laser trigger 22 is supplied from a clock source 28. Clock source 28 in the preferred embodiment generates a 2,000 Hertz clock pulse for synchronizing the radiation source and the receiver of the present system. Clock source 28 may comprise, for example, a Model 116 clock manufactured and sold by Systron-Donner Corporation of Van Nuys, Calif., or Model CO 231 manufactured and sold by Vectron Laboratories, Inc. of Norwalk, Conn.

The electromagnetic radiation output of the laser diode array 10 is applied through an optical beam forming device 30 which projects the generated electromagnetic radiation into a six degree beam, represented by the arrow 32, to impinge upon a target 34. While only one target 34 is illustrated for clarity, it will be understood that there often will be numerous targets at various ranges from the optics 30. The output of the laser diode array 10 will be hereinafter referred to as an interrogating beam or a series of interrogating pulse signals directed to impinge upon a target. In the preferred embodiment, the system is operable to detect targets lying between the range from about 700 to about 4,000 meters from the source of electromagnetic radiation, although it will be understood that the invention is useful over a wide variety of ranges.

Clock source 28 also provides an output to variable time delay circuitry 36, the function of which will be subsequently described. The output of variable time delay circuitry 36 is applied to drive an image intensifier receiver 40. Receiver 40 may comprise a gated detector such as a PIN diode, which sweeps out an image plane, or a gated discrete solid state detector array including charge coupled or charge injected devices. In the preferred embodiment, the receiver 40 comprises a gated image intensifier which is normally gated off and is gated on to receive only reflected interrogation pulse signals from the target 34 within a range window. The image intensifier receiver 40 may comprise, for example, a 25 millimeter microchannel inverter intensifier, Model 3603 manufactured and sold by Varo Electron Devices, Inc. of Garland, Tex. The receiver 40 also includes associated power supplies 42 and 44 which are gated power supplies and may comprise, for example, Model 3265 manufactured and sold by Varo Inc., Power Systems, Division. The receiver 40 further includes a clock source 46 which functions to trigger the receiver 40. The clock source 46 may comprise, for example, a Model 116 clock manufactured and sold by Systron-Donner Corporation.

Briefly stated, the function of the time delay circuitry 36 is to control the gating of the receiver 40 such that as the range between the target 34 and the receiver 40 increases, the gate delay continues to increase as a function of time, but the rate of this increase decreases as a function of time.

The receiver 40 receives reflected interrogating pulse signals identified by the arrow 48 from the target 34 through a bandpass filter 50 and an objective lens 52. In the preferred embodiment, the bandpass filter 50 may comprise a 100 Angstrom bandpass filter and the objective lens 52 may comprise a 155 millimeter lens. The output of the receiver 40 may then be applied to a display, not shown, for viewing by an operator to visually display the target or applied through appropriate eye pieces or camera adaptors to an SLR camera. The receiver 40 includes circuitry to integrate the number of reflected interrogating pulse signals from the target received from specific discrete range locations lying between the receiver and the target 34 to generate a resultant signal for application to a display.

In operation, the laser diode array 10 generates a series of interrogating pulse signals of constant amplitude and rate. For each interrogating pulse signal generated by the laser array 10, the receiver 40 receives a reflected interrogating pulse signal prior to the generation of a subsequent interrogating pulse signal by the laser diode array 10. The gating of the image intensifier receiver 40 produces a variable window width which in the preferred embodiment ranges from about two microseconds long to about 30 microseconds long. The gating function generated by circuitry 36 creates a variable time delay between transmitted interrogating pulse and opening of the receiver window. During each gate or range window, the receiver 40 receives reflected interrogating pulse signals.

The present invention controls and varies the time of initiation of successive range windows throughout each complete interrogating cycle such that the duration of successive windows is decreased to reduce the number of reflections received by receiver 40 from close range targets. The time of closing the range window is controlled to be a constant interval after initiating the interrogating pulse so as to allow reception of the reflected pulse from the maximum range of interest. By this means the number of reflections received from each target is maintained proportional to the fourth power of the distance to that target. Since the receiver 40 integrates the reflected interrogating signals which return when the window is open, the display intensity will be constant and independent of the range for each target.

During the initial generation of interrogation pulses, the range window is opened for long periods approximating the time between successive interrogation pulses. The variable time delay circuitry 36 causes a delay in opening the range window after each interrogation pulse, with the delay increasing rapidly during the first interrogation pulses of each complete interrogating cycle. As the range window is shortened to receive only reflections from the maximum target range, the delay rate slows, such that the range window length does not rapidly decrease as the last interrogation pulses of a cycle are transmitted. The range window delay time is proportional to the inverse of the pulse number to the fourth power, such that the number of received reflected interrogating pulse signals 48 which are received by the receiver 40 at a particular range segment is proportional to the fourth power of range. Since the number of received reflected integrating pulse signals increases proportionally to the fourth power of range, the resultant output of the receiver 40 is proportionally increased corresponding to the fourth power of range to compensate for the decrease in the amount of energy reflected as the distance between the receiver 40 and target 34 increases.

Figure 2:
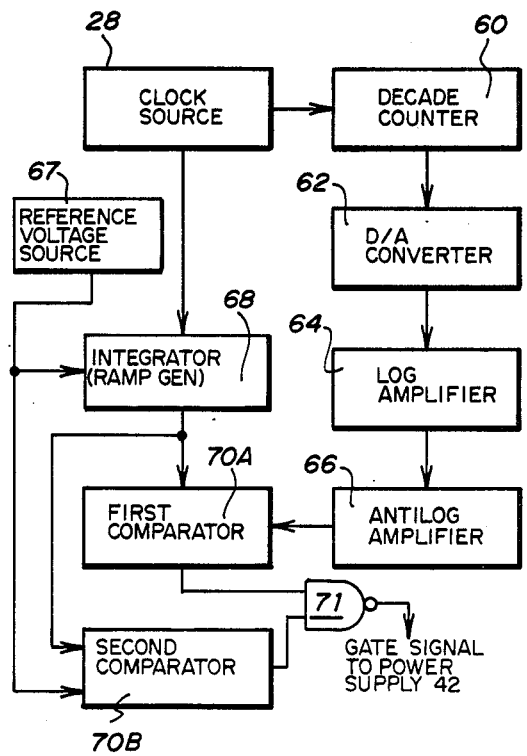
FIG. 2 is a block diagram of the variable time delay circuitry of the present invention.

The circuitry for generating the time function to control the delay in initiating successive range windows is illustrated in the block diagram of FIG. 2. The clock source 28 provides a symmetrical pulse to a decade counter 60. In the preferred embodiment the clock source provides a 2,000 Hertz pulse. The decade counter may comprise, for example, an MC 7490 I/C which counts the number of pulses provided by the clock source 28. Decade counter 60 in the preferred embodiment counts between 1 and 1024 pulses and automatically resets itself upon completion of counting to 1024 pulses. This range of pulses is selected in the preferred embodiment to correspond to a particular maximum range between the receiver 40 and target 34. The number of pulses counted by decade counter 60 is then applied to a digital-to-analog converter 62. Digital-to-analog converter 62 may comprise, for example, an MDA 10 F analog device, which provides a voltage output proportional to the output of counter 60.

The output of digital-to-analog converter 62 is applied to a logarithmic amplifier 64. Amplifier 64 may comprise, for example, a 755N analog device which generates a logarithmic output voltage function. The output of amplifier 64 is applied to an antilogarithmic amplifier 66, which may comprise, for example, a 755N analog device. The antilogarithmic amplifier 66 generates an antilogarithmic output voltage function.

A reference voltage source 67, which may comprise for example a voltage source connected to an IN821 Zener diode, applies a reference voltage to an integrator 68. The integrator 68 may comprise for example an LH0053 I/C which is reset for each clock pulse. The output of integrator 68 is applied to the positive input of a comparator 70A and to the negative input of a comparator 70B. Comparators 70A and 70B may comprise NE 529 I/Cs.

The reference voltage is also applied to the positive input of comparator 70B. The output from amplifier 66 is applied to the negative input of comparator 70A. The outputs from the comparators 70A and 70B represent voltage functions representative of the delay between the interrogating pulse and the initiation of the gate pulse. These comparator voltages are applied to the inputs of a NAND gate 71 which may comprise an MC 14011 gate. The output of gate 71 is applied to power supply 42 shown in FIG. 1 to define the incremental delay between successive gate windows.

The time delay between the interrogation pulse and the opening of the $n^{th}$ range window of the interrogation cycle may be represented by the following equation:

$$\Delta T = 2R/V(n/N)^4 \qquad (2)$$

wherein:
R = maximum range to target in meters,
V = speed of light in meters/second,
n = number of interrogation pulse, and
N = total number of pulses for each complete interrogation cycle.

Although FIG. 2 illustrates a particular circuit configuration for generating the time function to control the duration between successive range windows, it will be understood that additional circuit configurations may be utilized to generate a signal proportional to the inverse of the fourth power of range to control the range windows of the receiver 40.

Figure 3:
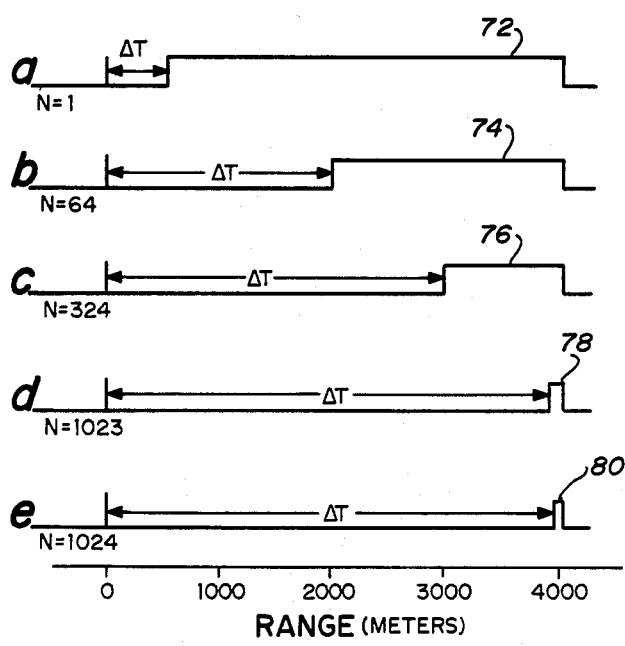
FIG. 3 is a diagram of waveforms illustrating the range window opening triggers and the variable receiver windows of the invention.

Referring to FIG. 3, waveforms illustrating specific examples of the shift in range windows as the distance between the receiver 40 and the target 34 increases are illustrated. Referring to FIGS. 3a and 3b, assuming a maximum range of 4000 meters, range windows 72 and 74 are illustrated wherein N=1 and N=64 in Equation 2. For N=1, or for the first generated interrogation pulse in a cycle, $\Delta T$ equals 4.71 microseconds and the range window 72 is opened at a range of 700 meters and stays open until 4000 meters when the next interrogation pulse is generated. In this embodiment, the system has thus been set to ignore reflections from the first 700 meters. For N=64, $\Delta T$ equals 13.33 microseconds, where the range window is opened between 2000 and 4000 meters. It may thus be seen that $\Delta T$ has rapidly increased between 0 and 2000 meters during the first 64 interrogation pulses.

Referring to FIG. 3c the range window 76 is illustrated and corresponds to a range of 3000 meters wherein N=324. $\Delta T$ in this case is 20 microseconds. It can be seen that the range windows 74 and 76 are shifted with respect to each other by a smaller time duration than range windows 72 and 74. Receiver 40 receives reflected interrogating pulse signals from the maximum ranges during all windows 72–76.

Referring to FIGS. 3d and 3e, the range windows 78 and 80 are illustrated, which each correspond closely to a range of 4000 meters. Where N=1023, $\Delta T$=26.56 microseconds, and where N=1024, ΔT=26.7 microseconds.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An imaging system for detection of a target comprising:
    an electromagnetic radiation source for generating a series of interrogating pulse signals directed towards the target;
    receiver means operable to be triggered for receiving during variable range windows reflected interrogating pulse signals from the target and for generating a resultant output signal; and
    circuit means connected for triggering the initiation of said variable space windows of said receiver means according to a variable delay function such that the number of reflected interrogating pulse signals received by said receiver means is dependent on the distance between said receiver means and the target, said receiver means thus generating a resultant output signal to provide a signal of constant amplitude independent of the distance between said receiver means and the target.

2. The imaging system of claim 1 wherein said variable range windows extend open until the reflected interrogating pulse signal has returned from the maximum range of interest.

3. The imaging system of claim 1 wherein the number of reflected interrogating pulse signals received by said receiver means increases as the distance between said receiver means and the target increases.

4. The imaging system of claim 1 wherein said interrogating pulse signals have a fixed gate width.

5. The imaging system of claim 1 wherein said circuit means controls the time duration between successive triggerings of said receiver means such that the time duration between adjacent ones of said variable range windows increases as the distance between said receiver and the target increases.

6. The imaging system of claim 1 wherein said receiver means integrates said received reflected interrogating pulse signals to form an optical image of the target.

7. The imaging system of claim 1 wherein the number of received reflected interrogating pulse signals received by said receiver means increases at a rate proportional to the fourth power of the distance between said receiver and the target.

8. An active imaging system for detecting a target comprising:
    an electromagnetic radiation source for generating gated interrogating pulse signals having a fixed gate width and directed towards the target;
    receiver means for being triggered to receive reflected interrogating pulse signals from the target during variable range windows;
    means for synchronizing the operation of said source and said receiver means;
    circuit means for triggering said receiver means to receive reflected interrogating pulse signals during variable range windows at a rate dependent upon the distance between the target and said receiver means; and
    means for integrating said received reflected interrogating pulse signals to generate a resultant signal of constant amplitude independent of the distance between said receiver means and the target.

9. The imaging system of claim 8 wherein said circuit means triggers said receiver means such that the trigger rate decreases as the distance between said receiver means and the target increases.

10. The imaging system of claim 8 wherein said receiver means comprises a gated image intensifier.

11. A method employing an active imaging system for detection of a target comprising:
    generating a series of interrogating pulse signals having a fixed gate width directed towards the target;
    receiving at a receiver reflected interrogating pulse signals from the target during variable window intervals;
    triggering said receiver to receive said reflected interrogating pulse signals during said variable window intervals; and
    varying the triggering of said receiver in dependence upon the distance between the target and said receiver.

12. The method of claim 11 and further including the step of:
    integrating at said receiver said received reflected interrogating pulse signals to generate a resultant signal of constant amplitude independent of the distance between said receiver and the target.

13. The method of claim 11 wherein the duration of successive ones of said variable window intervals varies so that the number of pulses received from each target is proportional to the fourth power of the distance from that target to the receiver.

* * * * *